United States Patent
Mirkin (10) Patent No.: US 7,073,138 B2
(45) Date of Patent: Jul. 4, 2006

(54) METHOD AND APPARATUS FOR CURSOR POSITIONING IN BI-DIRECTIONAL TEXT

(76) Inventor: Eugene Mirkin, 19121 Barnhart Ave., Cupertino, CA (US) 95014

( * ) Notice: Subject to any disclaimer, the term of this patent is extended or adjusted under 35 U.S.C. 154(b) by 151 days.

(21) Appl. No.: 10/456,802

(22) Filed: Jun. 6, 2003

(65) Prior Publication Data

US 2004/0249627 A1 Dec. 9, 2004

(51) Int. Cl.
*G09G 5/00* (2006.01)
(52) U.S. Cl. ............ 715/857; 715/858; 715/536; 715/529
(58) Field of Classification Search ........ 715/856–864, 715/526, 536, 529, 703
See application file for complete search history.

(56) References Cited

U.S. PATENT DOCUMENTS

| | | | | |
|---|---|---|---|---|
| 2002/0143825 A1* | 10/2002 | Feinberg | ............... | 707/526 |
| 2002/0146181 A1* | 10/2002 | Azam et al. | ............ | 382/309 |
| 2004/0039996 A1* | 2/2004 | Flam | ............... | 715/536 |
| 2004/0177322 A1* | 9/2004 | Atkin | ............... | 715/513 |

FOREIGN PATENT DOCUMENTS

WO WO 01/38957 A2 5/2001

OTHER PUBLICATIONS

"Enhanced Bi-directional Support in a Work Station Controller/PC Emulator," IBM TDB, vol. 37 No. 4A pp. 561-562, Apr. 1, 1994.*
Matitiahu Allouche, "Guidelines of a Logical User Interface for Editing Bidirectional Text," Mar. 20, 2002.*
Uri Habusha and Daniel Berry, "vi.iv, a bi-directional version of the vi full-screen editor," Electronic Publishing, vol. 3(2), pp. 65-91, May 1990.*
"Portable Layout Services: Context-dependent and Directional Text," The Open Group, 1997.*
"Bidirectional Language Cursor Formatting and Positioning", IBM Technical Disclosure Bulletin, vol. 34 No. 10A Mar. 1992, pp. 317-320.

* cited by examiner

*Primary Examiner*—Tadesse Hailu
(74) *Attorney, Agent, or Firm*—Charles W. Bethards (57) ABSTRACT

A cursor is moved through regions of text 300 having differing directions to a location visually adjacent to a previous cursor location. The cursor is moved in the direction of requested cursor movement even when moving from text having a first direction to text having a second direction. A comparison of direction for current and proposed cursor locations is made 810 in both a method and apparatus for so moving the cursor. The direction of a character to be inserted is also examined 816 in determining the next location of the cursor.

18 Claims, 8 Drawing Sheets

PRIMARY LAYOUT ⟶

METHOD AND APPARATUS FOR CURSOR POSITIONING IN BI-DIRECTIONAL TEXT

FIELD OF THE INVENTION

This invention relates in general to electronic devices capable of displaying text, and more specifically to a method and apparatus for positioning a cursor in bi-directional text.

BACKGROUND OF THE INVENTION

When creating and editing text within electronic devices, different languages are often interspersed in written documents. In some locales, for example, the Middle East, the languages so interspersed often have a different reading order. That is, an English language document with a primary text direction of left-to-right, may quote Hebrew or Arabic text having a text direction of right-to-left. A similar example is a cellular phone used for creating a text message having primarily right-to-left text that may include Roman characters having a reading order of left-to-right. An electronic device for creating and editing text often stores the individual characters in a text string. When moving the cursor for editing or placement of characters, a pointer is maintained corresponding to a point in the stored text string. Moving the cursor to the right, in left-to-right text will move the cursor to the next highest position in the string, that as will be described with reference to FIG. 1, can result in erratic discontinuous motion as perceived by the user. This makes it difficult for a user to predict or to select the next cursor position when editing characters. Clearly a need exists for a method and apparatus for cursor positioning in bi-directional text.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

In overview, the present disclosure concerns electronic devices that allow users to move a cursor or other indicia of location on or within a text document on a display (cursor) through text with different reading order for the purpose of reviewing and/or editing.

More particularly various inventive concepts and principles embodied in methods and apparatus for the control of a cursor in a natural and easy-to-use manner in cases where the cursor traverses text or a string of characters with opposite reading order, e.g. text comprising bi-directional characters are discussed. Text with opposite or differing reading order is text comprising characters, specifically multi directional or bi-directional characters, such as English and Hebrew characters where the normal reading order for the written language is respectively, left to right and right to left. In essence a given character has a direction or corresponding direction or associated direction that can ordinarily be used for guidance as to the direction of cursor movement. For example English characters have a corresponding direction of left to right meaning that the next character that is read will be to the right of the last character read or displayed. Hebrew characters are ordinarily read or displayed in the opposite direction, meaning that the next character that is displayed, entered, or read will be to the left of the last character displayed. In bidirectional text there will be characters, such as spaces and punctuation marks that are either directionless or where the direction may be ambiguous. The electronic devices of particular interest are those that allow multi-language text entry, such as computers, word processors, personal digital assistants (PDAs) and wireless communication devices, for example, cellular telephones.

As further discussed below various inventive principles are advantageously employed to analyze bidirectional text characters and non-directional characters, such as punctuation and spaces to allow movement of the cursor in a smooth, continuous manner as viewed by a user rather than as sequentially stored in an internal text string or text buffer.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
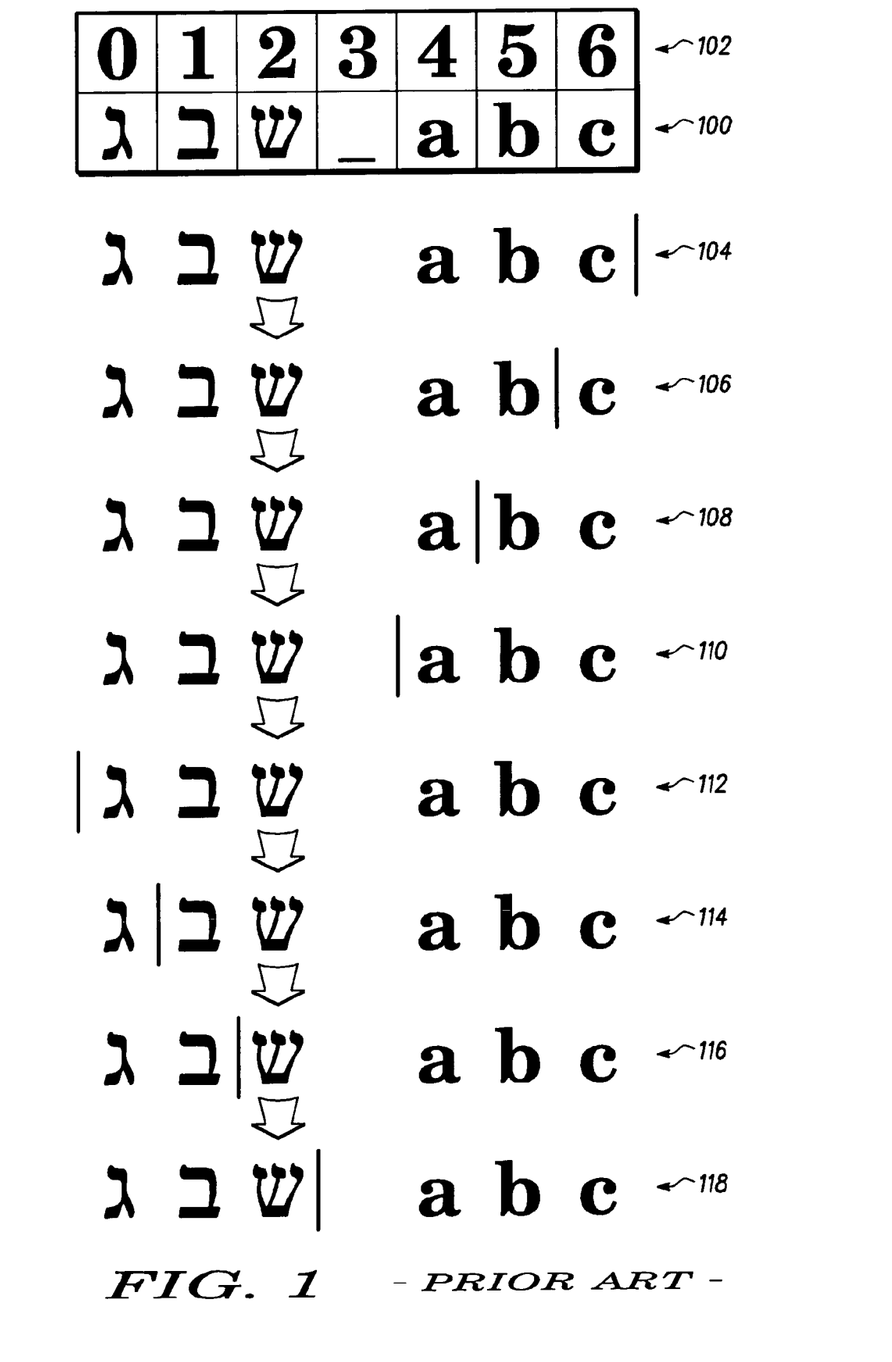
FIG. 1 depicts a prior art method of cursor movement in bi-directional text.

Referring to FIG. 1 a prior art scenario for cursor movement in bi-directional text will be described. A character string 100 comprising both right-to-left and left-to-right characters is stored in a text string with character location or index 102 that progresses from 0 to 6. The primary layout of the string is left-to-right. The cursor is positioned to the right of position six in the character location 102 with the cursor displayed at the far right of the text string 104 letter 'c'. As the left arrow is pressed the cursor moves in character location 102 to position 5 and visually to the right of the letter 'b' at 106. Following another left arrow push the cursor moves to the left in character location 102 to position 4 and the cursor is visually displayed to the right of the letter 'a' at 108. After another push or activation of the left arrow key, the cursor moves in character location 102 to position 3 and is displayed visually to the right of the 'space' at 110. Following one more left arrow push, the cursor is moved to position 2 in character location 102 but, since the orientation of the characters of the word have changed to right-to-left, the cursor is displayed to the left of the character ג, visually four spaces to the left of the last cursor location 112. A user would be uncertain where the next character would be placed, that is, to the left or the right of the character ג. Another press of the left arrow key will move the cursor to position 1 in character location 102 but will visually move the cursor in the displayed string 114 one space to the right, to the left of the character ב. This behavior is typical of current systems and can be erratic, confusing and unexpected to many users. Similar cursor movement is shown at 116 and 118 in response to additional left arrow key activations.

Figure 2:
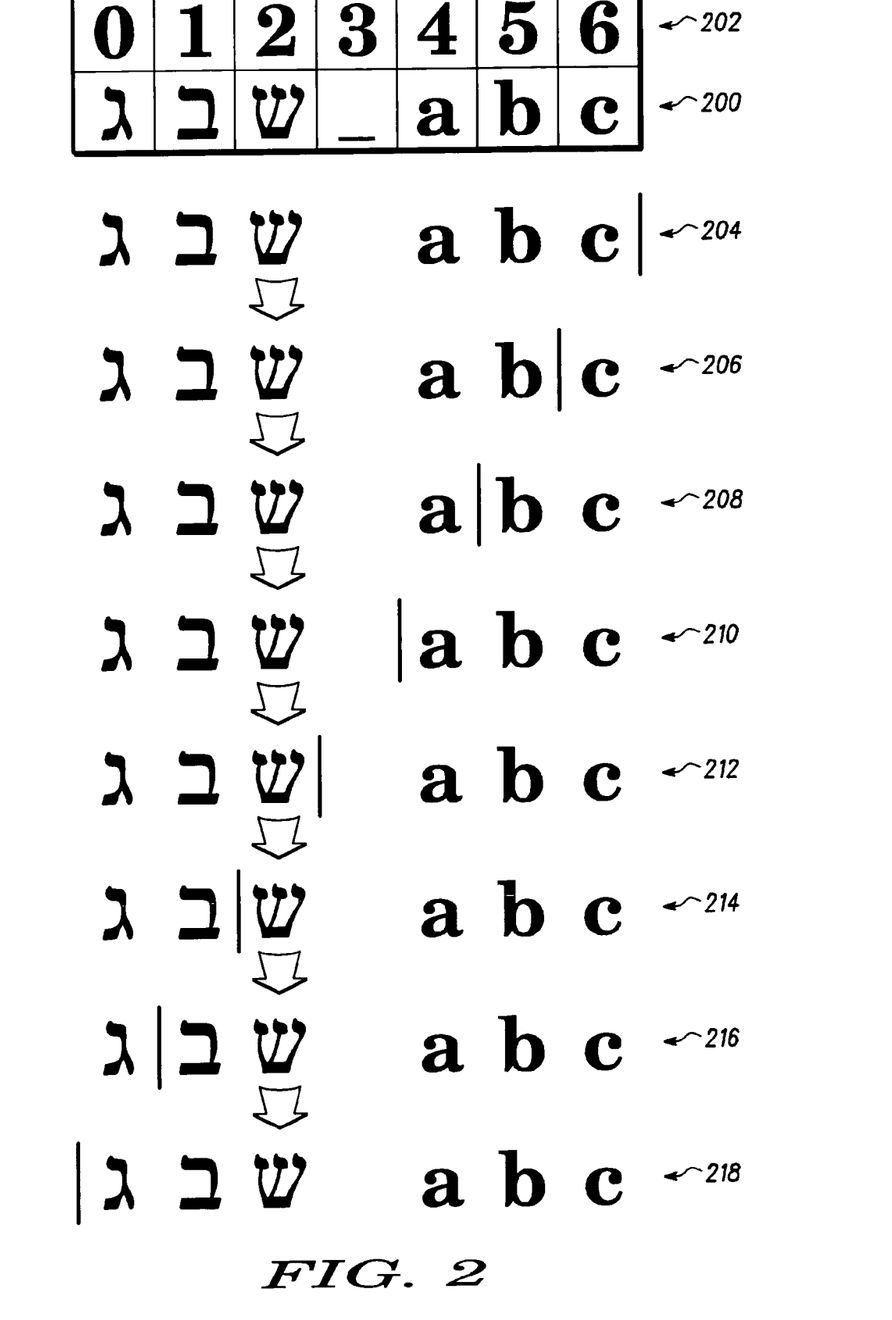
FIG. 2 depicts cursor movement in bi-directional text in accordance with the current invention.

Referring to FIG. 2, cursor movement in bi-directional text in accordance with the current invention is discussed and described. As before, a string 200 is shown with corresponding character locations 202. Using the same beginning condition as FIG. 1, the cursor is shown to the right of the letter 'c' in 204. A left arrow push moves the displayed cursor to the left, to the right of the letter 'b' at 206 after one left movement, to the right of the letter 'a' at 208 after two cursor movements, to the right of the 'space' at 210 after 3 cursor movements. Since the space is non-directional, special considerations, discussed below, are required to manage the cursor movement through such a character. Another left cursor movement request will cause the cursor to move visually one space to the left, to the right of the character 'ש' at 212. Another left cursor movement request will cause the cursor to move one character to the left, ending to the right of the character 'ב' at 214. This behavior is predictable and expected. There is no ambiguity as to where the next character will be inserted. Similar cursor movement is shown at 216 and 218.

Figure 3:
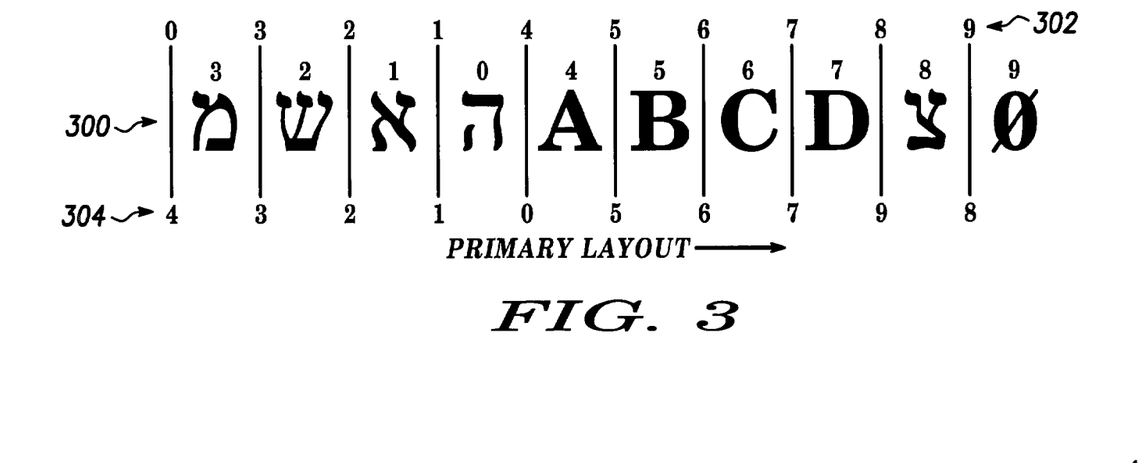
FIG. 3 depicts cursor indexing in primarily left-to-right text.

Referring to FIG. 3, cursor indexing in primarily left-to-right text is discussed and described. The characters of a string 300 of bi-directional text are shown, as they would be displayed to a user. The string 300 has a primary text layout or direction of left-to-right. An upper index 302 corresponds to cursor positions between the characters of the string 300 for left-to-right text as shown by the vertical lines. A lower index 304 corresponds to cursor positions when the current direction of entry for characters is right-to-left. The calculation of cursor position numbers and the relationship between the upper index 302 and lower index 304 is more fully described below with reference to FIGS. 5–9. The characters of the string 300 are labeled by the order in which they were entered, that is, their order in the internal representation of the text string. For example, the string 300 character 'A' is labeled 4 and was the fifth character entered, using a zero based indexing or counting scheme. It can be seen that Hebrew characters were entered beginning at string 300 positions 0, 1, 2 and 3 building to the left until the Roman character 'A' was entered. 'A' is displayed to the right of the first Hebrew character 'ה'. The additional Roman characters build to the right.

Figure 4:
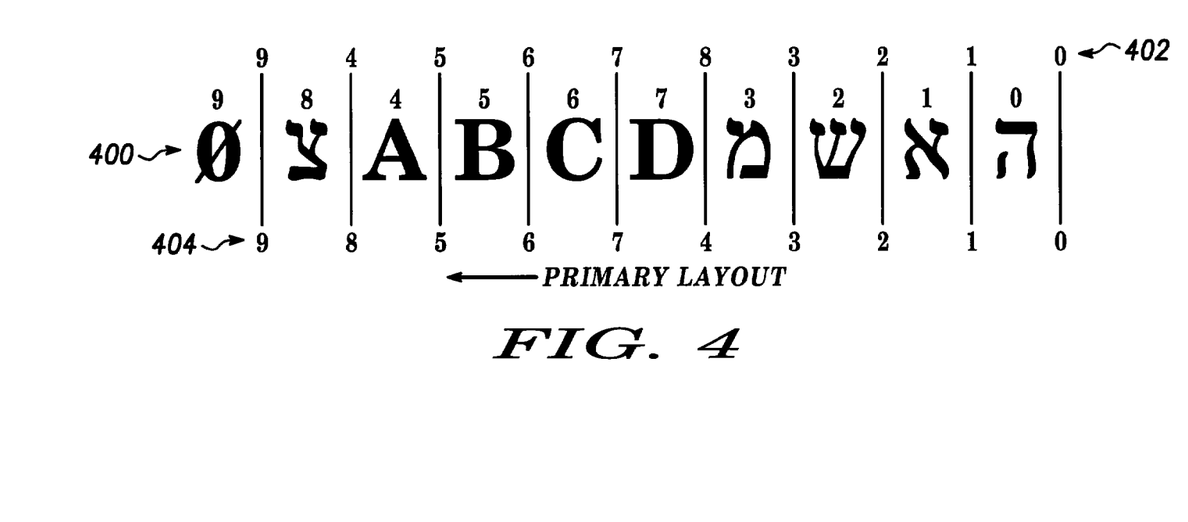
FIG. 4 depicts cursor indexing in primarily right-to-left text.

Referring to FIG. 4, cursor indexing in primarily right-to-left text will be discussed and described. The characters of a string 400 of bi-directional text are shown as they would be displayed to a user. The string 400 has a primary text layout or direction of right-to-left. An upper index 402 corresponds to cursor positions between the characters of the string 400 for left-to-right text as shown by the vertical lines. A lower index 404 corresponds to cursor positions between the characters for right-to-left text. The characters of the string 400 are labeled by the order in which they were entered, that is, their order in the internal representation of the text string. Hebrew characters were entered beginning at string 400 positions 0, 1, 2 and 3 building to the left until the Roman character 'A' was entered. The 'A' was initially displayed to the left of the Hebrew character 'מ'. As succeeding Roman characters B–D were entered, they built to the right of the letter 'A', filling in between the 'A' and 'מ'. The addition of the Hebrew character 'צ', string 400 position 8, resumes the primary right-to-left order with the character being placed to the left of the Roman characters.

Figure 5:
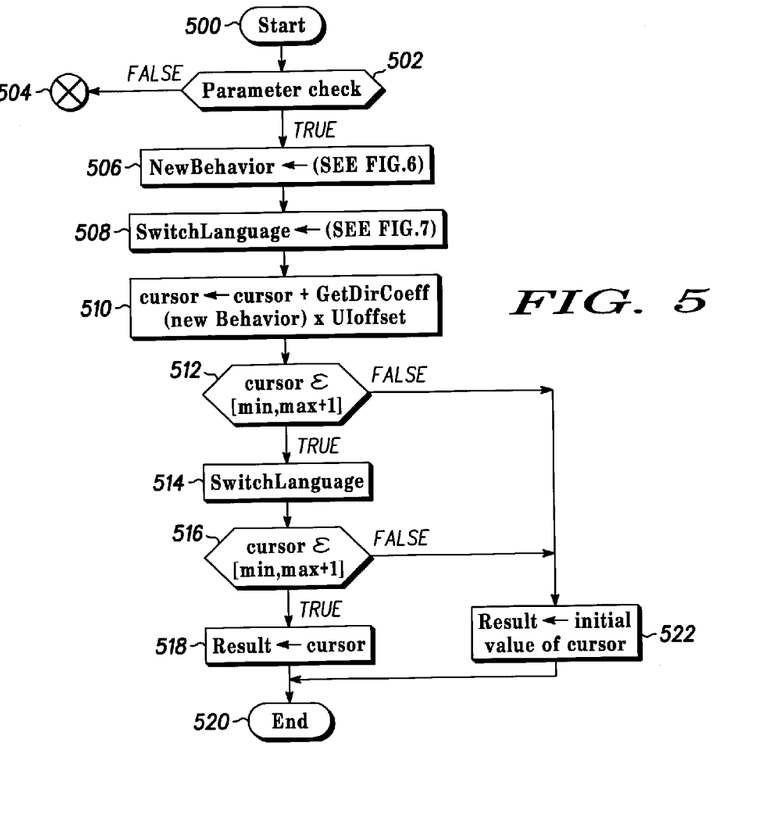
FIG. 5 is a flow chart of a method of moving a cursor in bi-directional text.

Referring to FIG. 5, a flow chart of a method of moving a cursor in bi-directional text will be discussed and described. The process represented in FIG. 5 returns a value of the new cursor location, for example a value for the upper index 302. The discussions of FIG. 5 through FIG. 10 rely on two functions:

GetReadingOrder takes the values string, cursor, min, max and primaryLayout as described below and returns the reading order or direction of the character of the string at the cursor.

GetDirCoeff takes the value of a given text direction, that is, a direction with respect to the primary text direction and returns +1 for left-to-right and −1 for right-to-left.

The process starts at 500 and a check of passed parameters 502 is made. If the parameters are not valid, processing ends at 504. The parameters passed may include:

string—the string of text to be analyzed min—index of the first character max—index of the last character cursor—the index for the cursor (Must be within [min, max+1])

UIOffset—+1/−1 indicating right/left movement on the screen primaryLayout—visual word order, right-to-left (−1) or left-to-right (+1)

currentBehavior—text direction of the character to be entered next

If the parameters are valid, processing continues at 506, where the reading order for the next cursor position is determined.

Figure 6:
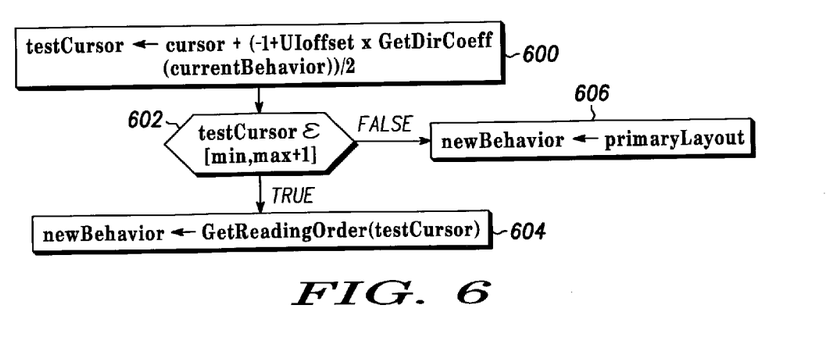
FIG. 6 is a flow chart showing further detail of a portion of the method of FIG. 5.

Referring briefly to FIG. 6, a value for parameter testCursor is determined 600 based on the parameters passed to the routine and validated at 502. The function GetDirCoeff (parameter) returns a +1 for left-to-right and −1 for rightto-left, as mentioned above. This has the effect of assigning a first direction to be left-to-right and assigning a second direction to be right-to-left when the primary direction of a string 300 comprising the bi-directional characters is left-to-right. For example, in a situation corresponding to the text string of FIG. 3, with the cursor at position 4 on the upper index 302 and a left arrow key press resulting in UIOffset=−1:

| testCursor | cursor + | (−1 + UIoffset x GetDirCoeff(currentBehavior))/2 |
|---|---|---|
|  | 4 + | (−1 + −1 x −1 ))/2 |
|  | 4 + | 0 / 2 |
| testCursor = 4 |  |  |

The value of testCursor is checked 602 to be in range of the string. In the example case, the value 4 is between 0 and 9 and processing continues at 604. The variable newBehavior is assigned a reading order of −1 by the function GetReadingOrder, a function that returns the reading order of a character at the index location. If the value of testCursor had been outside the valid text range, processing continues from 602 to 606 and a value equal to the current primary layout is assigned to newBehavior.

Returning to FIG. 5, the SwitchLanguage function 512 is executed. SwitchLanguage is discussed in detail with respect to FIG. 7. SwitchLanguage returns a value for a cursor index that corresponds to the same displayed position but has a different text direction in applicable cases. In the example using FIG. 3, the cursor at upper index 302 position 4 is recalculated to have a value of 0, in essence moving the cursor down to the lower index 304. The cursor value is updated at 510:

| cursor | cursor + | GetDirCoeff(newBehavior) x UIoffset |
|---|---|---|
|  | 0 + | −1 x −1 |
|  | 0 + | 1 |
| cursor = 1 |  |  |

The cursor index value is increased by one to the value 1. In the example of FIG. 3 the cursor at the conclusion of the remaining validation steps is moved to the left one space, the desired result of a left arrow key press.

The method 510 or a software program incorporating it calculates the next position utilizing the current position of the cursor, the request for cursor movement, the primary direction for a string comprising the bi-directional characters, and a direction for a next character.

The value of the cursor is checked 512 to be in a valid range. The method, or a software program incorporating it, assigns a value, as shown for example by the numbers associated with each character 300 in a string comprising the bidirectional characters corresponding to the order entered. Those numbers are used in determining that the next position is greater than or equal to the value of the first character and less than or equal to one plus the value of the latest character. In the case of FIG. 3, valid values of the next position are between 0 and 9.

When 512 is true, as in the example, processing continues at 514, where SwitchLanguage is called again to restore the cursor to the original language direction. To continue with the example of FIG. 3, the lower index 304 value of 1 is converted to an upper index 302 value of 1. The value is checked to be in range 516. When true, the return value of the function is set 516 to the value of the cursor, in the case of the example, 1, and the function ends 520. In the case where either range test 512 or 522 fails, the return value of the function is reset 522 to the original value of the cursor and the function ends 520. The cursor is visually moved one character to the left, corresponding to the key press and the expected behavior. This method, or a software program incorporating it, facilitates a user interface by moving a cursor across bidirectional characters on a display and has been shown to calculate, responsive to a request for cursor movement, a next position of the cursor when traversing from a first character having a first direction to a second character having a second direction. It then moves the cursor to the next position, the next position being visually adjacent to a current position of the cursor.

FIG. 6, a flow chart showing further detail of the flow chart of FIG. 5 was described in the above discussion.

Figure 7:
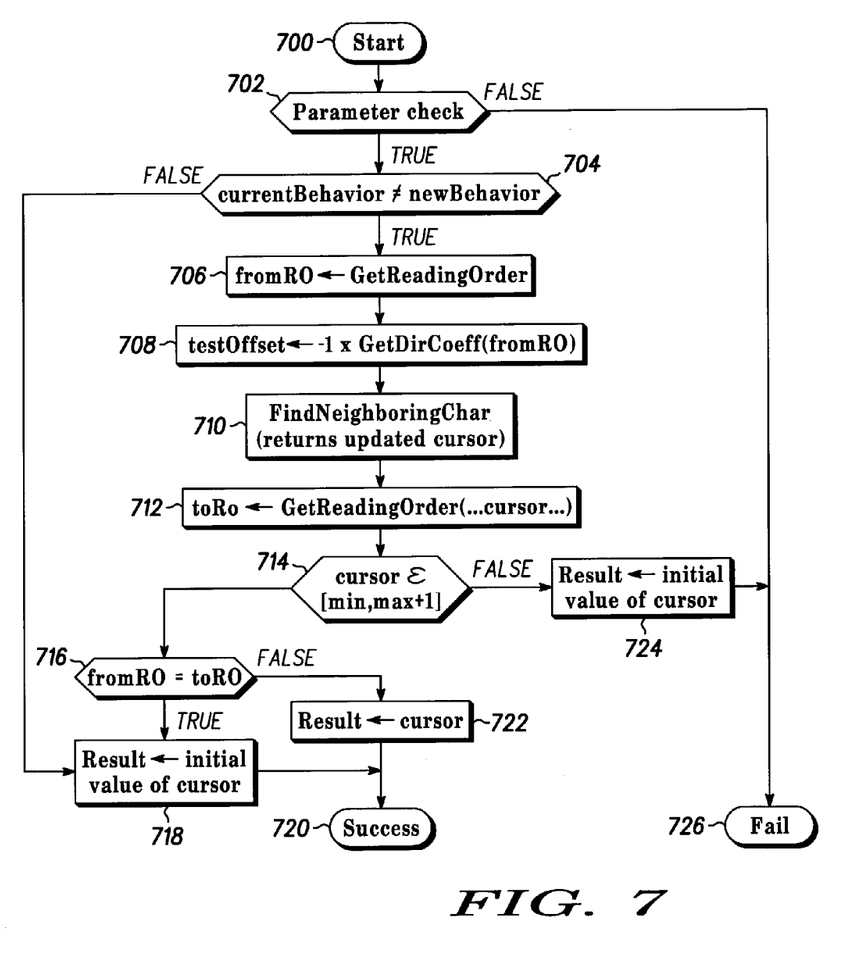
FIG. 7 is a flow chart of a method of determining a new cursor position when traversing bi-directional text.

Referring to FIG. 7 a flow chart for determining a new cursor position when traversing bi-directional text is discussed and described. The function recalculates the value of the cursor position when a language direction change is encountered. From the start 700 a parameter check is performed 702. The parameters passed to the function may include:

string—the string of text to be analyzed
    min—index of the first character
    max—index of the last character
    cursor—the index for the cursor (Must be within [min, max+1])
    primaryLayout—+1/−1 visual word order, right-to-left or left-to-right
    currentBehavior, newBehavior—behaviors affecting placement of the next inserted character If the parameter check 702 fails the routine returns with the cursor unchanged and ends 726. When the parameter check passes, a test is performed 704 to determine if there is a change in text direction. When currentBehavior does not equal the newBehavior, processing continues at 706. The parameter fromRO is set to the reading order of the character at the current value of the cursor. The parameter testOffset is set 708 by −1× GetDirCoeff to +1 for left-to-right and −1 for right-to-left, based on the current value of fromRO, e.g., the inverse of the actual value of the GetDirCoeff(from R0). The function FindNeighboringChar 710 is called and may return an updated value of the cursor. This function is discussed in more detail with respect to FIG. 8, but serves to determine a value for GetDirCoeff if the current character has an indeterminate direction, such as a 'space.' The parameter toRO is set 712 to the reading order of the character pointed to by the current cursor value. A test 714 is performed to ensure the cursor is within the valid range of the string.

When true the values of fromRO and toRO are compared 716. If equal (true) no change is required, the return value is set 718 to the initial value of the cursor and the function ends successfully 720. If fromRO does not equal toRO 716 the false branch is taken and the return value is set 722 to the value of the cursor and the function ends 720. If the cursor is outside the valid range 714, the false branch is taken, the return value is set 724 to the initial value of the cursor and the function ends 726. When no change of direction is indicated at 704, the false branch is taken to 718, where the return value is set to the initial value of the cursor and the function ends 720.

The effect is to calculate the next position in part by determining a current character direction 706 or direction corresponding to a current character, determining the next position direction 712 and comparing whether the next position direction matches the current character direction to give a result 716. The result is used in calculating the next position by following either the true branch to 718 or the false branch to 722.

Figure 8:
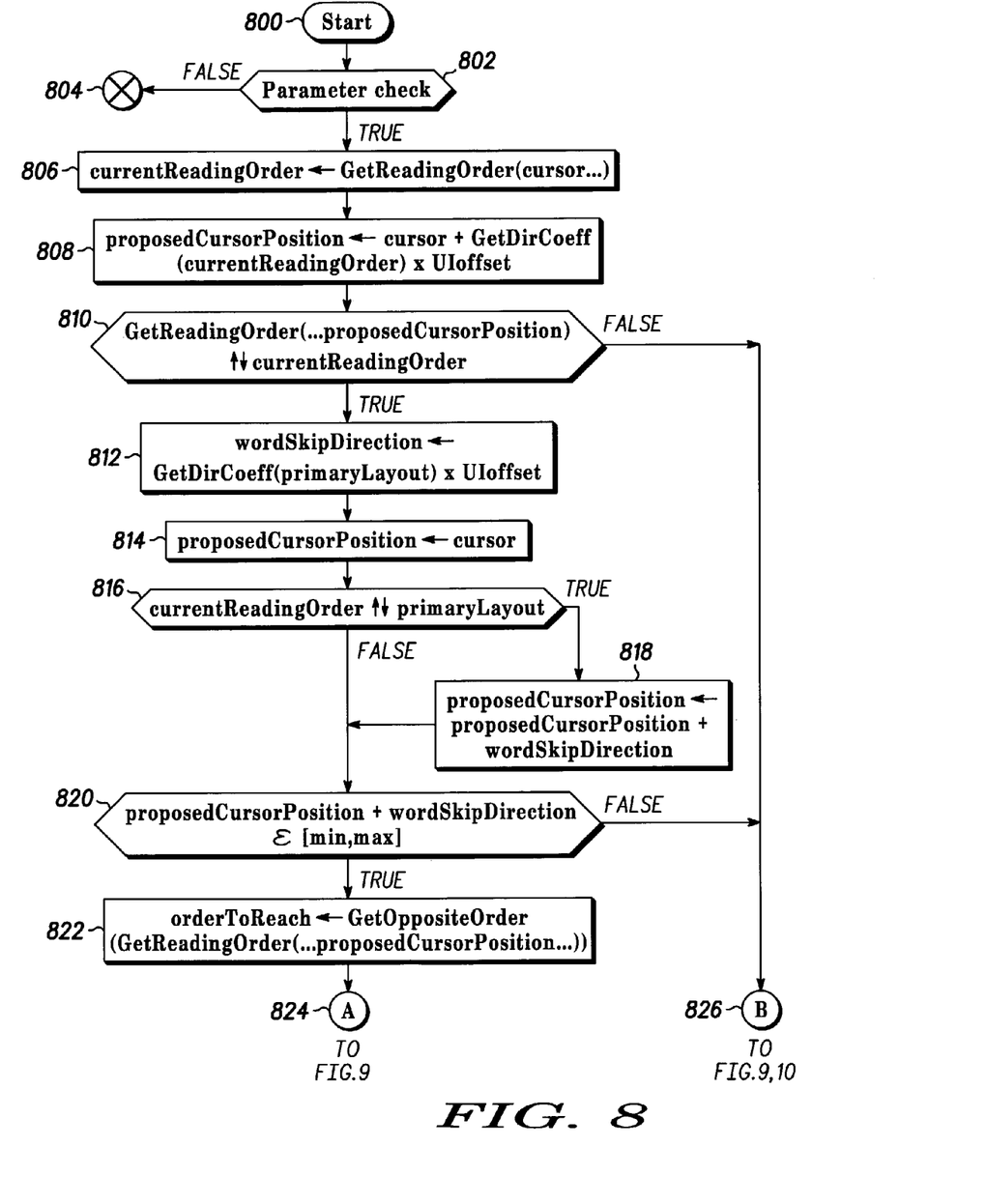
FIG. 8 is a flow chart of a method of finding the direction of a neighboring character in bi-directional text.

Referring to FIG. 8 a flow chart for finding the direction of a neighboring character in bi-directional text will be discussed and described. From the entry point 800 a check of the passed parameters is made 802. If the parameter check fails processing stops 804 and the routine returns a fail message. When the parameter check 802 passes, processing continues at 806. The parameters passed to this routine may include:

string—the string of text to be analyzed
    min—index of the first character
    max—index of the last character
    cursor—the index for the cursor (Must be within [min, max+1])
    UIOffset—+1/−1 indicating right/left movement on the screen
    primaryLayout—+1/−1 visual word order, right-to-left or left-to-right
    testoffset—a value calculated at 708

The parameter currentReadingOrder is set 806 to the reading order at the current cursor location by the function GetReadingOrder. A value for proposedCursorPosition is set 808 to the current cursor plus the direction of the current reading order times the UIOffset. That is, the requested cursor movement in light of the current text direction is used to calculate a proposed new cursor position. A test is performed 810 to determine if the reading order of the proposed cursor position is not co-directed with the current reading order. When true, a parameter, wordSkipDirection, is set 812 to the direction of the primary layout (GetReadingorder( . . . primaryLayout)) times the requested cursor movement (UIOffset). The parameter ProposedCursorPosition is reset with the current value of the cursor at 814. The parameter ProposedCursorPosition is reset since the directions were not the same at 810 and the calculation of proposed cursor position is restarted. A test is made to determine 816 if the currentReadingOrder is co-directed with the primary layout. When true the proposedCursorPosition is updated 818 to include the wordSkipDirection value and processing continues at 820. When the test at 816 fails processing continues at 820 where a test is performed to see if the proposedCursorPosition plus the wordSkipDirection value is within the set of [min, max]. If the path to 820 included 818, the value of proposedCursorPosition already includes the wordSkipDirection vector so the comparison 820 is not made to the range [min, max+1]. When the test at 820 is true processing continues at 822 where the parameter orderToReach is set to the opposite (i.e. times −1) of the value of GetReadingOrder for the proposedCursorPosition. Processing continues 824 at A, shown in FIG. 9. When the test at 820 fails, processing continues 826 at B, shown in FIG. 10.

Figure 9:
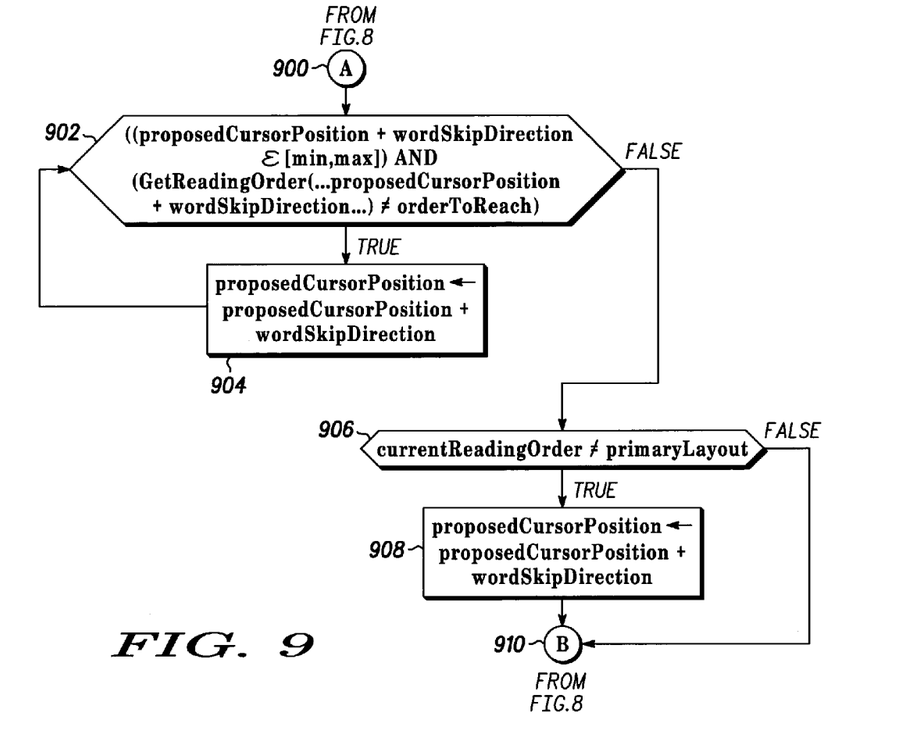
FIG. 9 is a continuation of the flow chart of FIG. 8.

Referring to FIG. 9, a continuation of the flow chart of the method of FIG. 8 is discussed and described. Continuing from 824 at 900, two tests are performed 902 to determine that the value for proposedCursorPosition+wordSkipDirection is within the range of [min, max] and not equal to the value orderToReach from 822. When true, the value of proposedCursorDirection is incremented 904 by wordSkipDirection and the test is performed 902 again until a false value is determined. In operation, this method or a software program incorporating it calculates the next position direction by testing an additional position direction when the next position direction is indeterminate. At 906 a test is performed to determine is the currentReadingOrder is not equal to the primaryLayout. When true, the proposedCursorPosition is incremented 908 by the value of wordSkipDirection and processing continues 910 at B. When the result of 906 is false, processing continues 910 at B, shown in FIG. 10.

Figure 10:
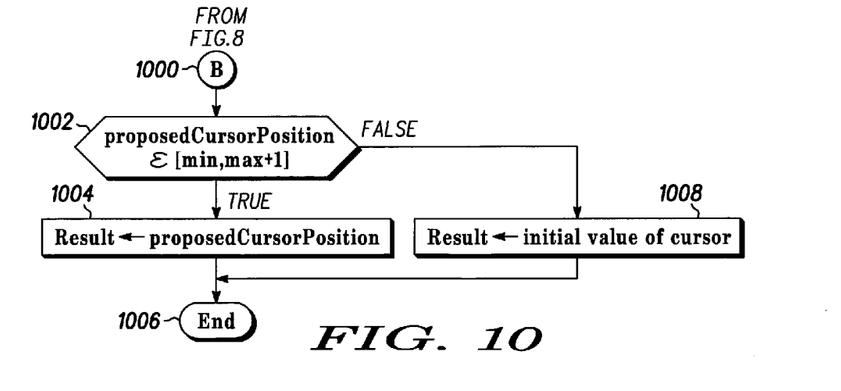
FIG. 10 is a continuation of the flow chart of FIG. 8.

Referring to FIG. 10, a continuation of the flow chart of FIG. 8 is discussed and described. Processing starts at B 1000 from either 910 or 826. A test is performed 1002 to determine if the proposed cursor position is within the range of [min, max+1]. When true, the return value of the function is set 1004 to proposedCursorPosition and the function ends 1006. When the test 1002 fails, the return value is set 1008 to the initial value of the cursor and the function ends 1006.

Figure 11:
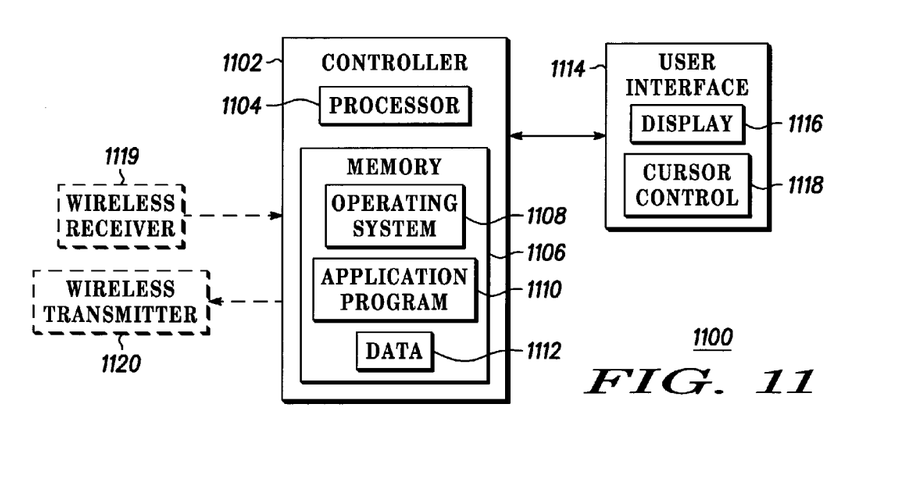
FIG. 11 depicts, in a simplified and representative form, a block diagram of an electronic device using cursor positioning in bidirectional text.

Referring to FIG. 11 a block diagram of an electronic device suitable for using cursor positioning in bi-directional text will be discussed and described. An electronic device 1100 for cursor positioning in bi-directional text comprises a controller 1102. The controller 1102 further comprises a processor 1104 for executing software functions. The controller further comprises memory 1106 for storing operating system instructions 1108, application programs 1110, and both user and program data 1112. The memory 1106 may include volatile and non-volatile types, both semiconductor and magnetic. The electronic device 1100 further comprises a user interface 1114. The user interface comprises a display 1116 and a cursor control 1118, such as a keypad, keyboard, scratch pad, touch screen, mouse, trackball or the like. The electronic device is any of several known and available products and may include wireless communication devices with receivers 1119 and transmitters 1120 such as cellular telephones, personal digital assistants, and desktop or laptop computers. Cellular telephones may include those from manufacturers such as Motorola that support text messages, for example, the i95 or the T720. Personal digital assistants may include units from Handspring and Palm, with or without wireless connectivity. Desktop or laptop computers that support multiple languages are available from manufacturers such as Dell using operating systems from companies such as Microsoft.

The methods described herein are best facilitated in software code installed and operated on a processor 1104 as part of the operating system 1108 or an application program 1110. The development of the code, given the instructions herein, requires ordinary skill in the art and is easily accomplished by software developers or programmers of ordinary skill. Any of a number of software languages, such as C, C++, Java or the like and their associated commercial development environments provide suitable environments for the development and delivery of such code. Commercially available operating systems such as Sun Solaris, Microsoft Windows, Linux and others provide suitable operational environments for the execution of the code and any related Java virtual machine, if required.

In operation, an electronic device 1100 is arranged to support movement of a cursor through bi-directional text or text comprising characters with differing corresponding or associated directions. The electronic device 1100 comprises a user interface 1114 having a display 1116 for displaying the bi-directional text and a cursor control 1118, such as conventional arrow keys, for moving the cursor. The electronic device 1100 also comprises a processor 1104 coupled to the user interface 1114 for moving the cursor responsive to the cursor control 1118. The cursor is moved to an adjacent displayed location when traversing characters of different direction, as in the case of crossing from Roman characters to Arabic or Hebrew characters. The cursor is moved in the direction of a request from the cursor control 1118 when traversing text having a different direction than a primary direction of the bi-directional text as shown and discussed in FIG. 2, 212–216. The electronic device 1100, using its processor 1104, is operable to calculate a next position of the cursor using the current position of the cursor, the request for cursor movement from the cursor control 1118, a primary direction of the bi-directional text or overall document, and a direction for a next character. The direction of the next character may be used when the cursor movement is accompanied by a text character key press or paste operation that results in a character insertion. The electronic device 1100 and processor 1104 should determine that the next position of the cursor is within a valid range, that is, within the bounds of the current text string or one beyond. This can be done by assigning a value to each character of the bi-directional text, where the value corresponds to the order each character is entered. Then a comparison is made between the proposed next cursor position to determine that the next position is greater than or equal to the value of the first character and less than or equal to one plus the value of the latest character. As described above, the processor determines a next position direction when calculating the next position, to ensure proper placement of a new character or proper cursor placement when deleting a character. In some cases the next position direction may be indeterminate, such as, when the character is a space or punctuation. When this occurs, the processor may determine a direction of an additional position, e.g. a neighboring character whose direction is defined for use in defining a direction of the indeterminate character.

The methods and apparatus discussed above, and the inventive principles thereof are intended to and can alleviate problems caused by cursor movement through bi-directional text using the character string as a reference. Using the principle of calculating cursor movement by its visual location rather than the internal character string greatly simplifies the case of use and training issues related to using a product supporting bi-directional text entry and editing. Using virtual cursor positions based on a combination of primary cursor movement and current text direction at the cursor location allows the accurate location of the cursor as displayed as well as correctly designating a next cursor location. An additional principle allowing definition of a character direction for non-directional characters such as spaces and punctuation solves another problem in consistently presenting cursor movement in bi-directional text.

Various embodiments of methods and apparatus for managing cursor movement and text entry in bidirectional text have been discussed and described. It is expected that these embodiments or others in accordance with the present invention will have application to many text entry and editing applications. The disclosure extends to the constituent elements or equipment comprising such systems and specifically the methods employed thereby and therein. Using the inventive principles and concepts disclosed herein advantageously allows or provides for accurate, predictable cursor movement in and across bi-directional text which will be beneficial to users of devices employing such principles and concepts.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method to facilitate a user interface by moving a cursor across bi-directional characters on a display, the method comprising:
    calculating in a processor, responsive to a request for cursor movement and in accordance with a deterministic algorithm, a next position of the cursor when traversing from a first character having a first direction to a second character having a second direction;
    determining whether the next position is within a valid range including
        assigning a value to each character in a string comprising the bi-directional characters corresponding to an order entered; and
        determining that the next position is greater than or equal to the value for the first character and less than or equal to one plus the value for a latest character; and
    moving the cursor to the next position, the next position being visually adjacent to a current position of the cursor.

2. The method of claim 1 wherein the calculating the next position utilizes one of a current position of the cursor, the request for cursor movement, a primary direction for a string comprising the bi-directional characters, and a direction for a next character.

3. The method of claim 1 wherein the calculating the next position further comprises:
    determining a current character direction;
    determining a next position direction;
    determining whether the next position direction matches the current character direction to give a result; and
    calculating the next position according to the result.

4. The method of claim 3 wherein the determining the next position direction further comprises:
    determining an additional position direction when the next position direction is indeterminate.

5. The method of claim 1 wherein calculating the next position further comprises:
    assigning the first direction to be left-to-right and assigning the second direction to be right-to-left when a primary direction of a string comprising the bi-directional characters is left-to-right.

6. A software program to implement a user interface for moving a cursor through bi-directional text on a display, the software program when installed and operating on a processor resulting in the processor:
    responsive to a request for cursor movement, calculating a next deterministic position of the cursor when traversing from a first character having a first direction to a second character having a second direction; where the calculating the next position determines whether the next position is within a valid range, and
        assigns a value to each character in the bi-directional text corresponding to the order entered; and determines that the next position is greater than or equal to the value of the first character and less than or equal to one plus the value of the latest character; and moving the cursor to the next deterministic position, the next deterministic position being visually adjacent to a current position of the cursor.

7. The software program of claim 6 wherein the calculating the next position uses one of a current position of the cursor, the request for cursor movement, a primary direction for the bi-directional text, and a direction for a next character.

8. The software program of claim 6 wherein the calculating the next position comprises:
determining a current character direction;
determining a next position direction;
determining whether the next position direction matches the current character direction to give a result; and
calculating the next position according to the result.

9. The software program of claim 8 wherein the calculating the next position direction comprises testing an additional position direction when the next position direction is indeterminate.

10. The software program of claim 6 wherein the calculating the next position assigns the first direction to be left-to-right and assigns the second direction to be right-to-left when a primary direction of a string comprising the bi-directional characters is left-to-right.

11. An electronic device arranged to support movement of a cursor through bi-directional text, the electronic device comprising:
a user interface comprising a display for displaying the bi-directional text and a cursor control for moving the cursor; and
a processor coupled to the user interface for moving the cursor responsive to the cursor control,
wherein the cursor is moved to an adjacent displayed location when traversing characters having different corresponding directions and wherein the processor determines that a next position for the cursor is within a valid range and calculates the next position by:
assigning a value to each character of the bi-directional text, the value corresponding to the order entered; and
determining that the next position is greater than or equal to the value for the first character and less than or equal to one plus the value for the latest character.

12. The electronic device of claim 11 wherein the cursor is moved in the direction of a request from the cursor control when traversing text having a different direction than a primary direction of the bi-directional text.

13. The electronic device of claim 11 wherein the processor is operable to calculate a next position of the cursor using a current position of the cursor, a request for cursor movement, a primary direction of the bi-directional text, and a direction for a next character.

14. The electronic device of claim 13 wherein the processor determines a next position direction when calculating the next position, and determines a direction of an additional position when the next position direction is indeterminate.

15. A method to facilitate a user interface including moving a cursor through a string of characters on a display, the characters being bi-directional characters, the method comprising:
calculating in a processor and in accordance with a deterministic algorithm, responsive to a request for cursor movement, a next position of the cursor when traversing from a first character corresponding to a first language wherein text of the first language is read in a first direction to a second character corresponding to a second language wherein text of the second language is read in a direction opposite to the first direction wherein the calculating the next position utilizes a current position of the cursor, the request for cursor movement, a primary direction for the string comprising the bi-directional characters, and a direction for a next character;
determining whether the next position is within a valid range of positions including:
assigning a value to each character in the string comprising the bi-directional characters, the value corresponding to the order of entry for the each character; and
determining that the next position is greater than or equal to the value for the first character and less than or equal to one plus the value for a latest character; and
moving the cursor to the next position, the next position being visually adjacent to a current position of the cursor.

16. The method of claim 15 wherein the calculating the next position further comprises:
determining a direction of cursor movement corresponding to a current character;
determining a next direction of cursor movement corresponding to a next position;
determining whether the next direction of cursor movement matches the direction of cursor movement corresponding to the current character to give a result; and
calculating the next position according to the result.

17. The method of claim 16 wherein the determining the next direction of cursor movement further comprises:
determining an additional direction when the next direction of cursor movement is indeterminate.

18. The method of claim 15 wherein calculating the next position further comprises:
assigning the first direction to be left-to-right and assigning the second direction to be right-to-left, when a primary direction of the string comprising the bi-directional characters is left-to-right.

* * * * *